(12) United States Patent
Forsberg

(10) Patent No.: US 11,922,653 B2
(45) Date of Patent: Mar. 5, 2024

(54) LOCATING SYSTEM

(71) Applicant: FORSBERG SERVICES LTD, Lancaster (GB)

(72) Inventor: Charles Forsberg, Lancaster (GB)

(73) Assignee: Forsberg Services Ltd., Heysham Port (GB)

( * ) Notice: Subject to any disclaimer, the term of this patent is extended or adjusted under 35 U.S.C. 154(b) by 482 days.

(21) Appl. No.: 17/309,639

(22) PCT Filed: Nov. 12, 2019

(86) PCT No.: PCT/GB2019/053199
§ 371 (c)(1),
(2) Date: Jun. 11, 2021

(87) PCT Pub. No.: WO2020/099855
PCT Pub. Date: May 22, 2020

(65) Prior Publication Data
US 2022/0012910 A1  Jan. 13, 2022

(30) Foreign Application Priority Data
Nov. 12, 2018 (GB) ..................... 1818357

(51) Int. Cl.
*G06T 7/73* (2017.01)
*G01S 5/16* (2006.01)
(Continued)

(52) U.S. Cl.
CPC ............... *G06T 7/73* (2017.01); *G01S 5/163* (2013.01); *G01S 17/42* (2013.01); *G01S 17/86* (2020.01);
(Continued)

(58) Field of Classification Search
CPC ............. G06T 7/73; G06T 2207/10028; G06T 2207/30244; G06T 2207/10016;
(Continued)

(56) References Cited

U.S. PATENT DOCUMENTS 7,519,502 B1 * 4/2009 Carneal .................. G01S 17/89
702/167
10,176,590 B2 * 1/2019 Sakamoto ............. G06T 15/205
(Continued)

FOREIGN PATENT DOCUMENTS

| WO | 2014/132090 A2 | 9/2014 |
|---|---|---|
| WO | 2015/049675 A1 | 4/2015 |

OTHER PUBLICATIONS

Combined Search and Examination Report for counterpart UK Application GB1818357.4, dated May 14, 2019.
(Continued)

*Primary Examiner* — Timothy R Newlin
(74) *Attorney, Agent, or Firm* — Rosenberg, Klein & Lee

(57) ABSTRACT

An object locating system (100) in which there is an observation device (104) observing at least three datums (106, 112, 114), each of which datums (106, 112, 114) having a positioning system that reports it position to the observation device (104). The positioning systems of the datums (106, 12, 114) being calibrated so as to accurately report their relative positions. The observation device (104) has a camera whose field of view (116) contains an object (18) to be located as well as at least two of the datums (106, 112,114) and a range finder that measures the distance (110) between the observation device (104) and at least one object (18) within the field of view (116) of the camera. A computing device calculates an azimuth and (X1, X2) elevation angle (Y1, Y2) between two datums (122, 114), or between the optical axis of the camera and each datum (112, 114),in the image so as to triangulate the position and attitude of the
(Continued)

camera (104) at the time the image was captured using received position data for each datum (106, 112, 114) at the time the image was captured; and also calculates an azimuth and elevation angle between an optical axis of the camera and the object (18) in the image. Knowing the position and attitude of the camera (104) and a distance (110) to the object (18) at the time the image was captured, it triangulates a position of the object (18) at the time the image was captured.

15 Claims, 5 Drawing Sheets

(51) Int. Cl.
  *G01S 17/42* (2006.01)
  *G01S 17/86* (2020.01)
(52) U.S. Cl.
  CPC ............ *G06T 2207/10028* (2013.01); *G06T 2207/30244* (2013.01)
(58) Field of Classification Search
  CPC . G06T 2207/10032; G06T 2207/30181; G01S 5/163; G01S 5/16; G01S 17/42; G01S 17/86; G01S 7/497
  See application file for complete search history.

(56) References Cited

U.S. PATENT DOCUMENTS

| | | | | |
|---|---|---|---|---|
| 10,521,663 | B1* | 12/2019 | Claussen | B64D 47/08 |
| 10,853,942 | B1* | 12/2020 | Boyd | G06V 10/98 |
| 2003/0185434 | A1* | 10/2003 | Lee | G06F 3/012 |
| | | | | 382/154 |
| 2004/0264648 | A1* | 12/2004 | Claus | G06T 7/73 |
| | | | | 378/163 |
| 2008/0267454 | A1* | 10/2008 | Kobayashi | G01B 11/14 |
| | | | | 382/106 |
| 2008/0285854 | A1* | 11/2008 | Kotake | G06T 7/73 |
| | | | | 382/190 |
| 2009/0022369 | A1* | 1/2009 | Satoh | G01B 21/04 |
| | | | | 382/106 |
| 2011/0122257 | A1* | 5/2011 | Kirk | G01S 5/16 |
| | | | | 348/E17.002 |
| 2011/0128372 | A1* | 6/2011 | Malecki | G05D 1/0206 |
| | | | | 382/106 |
| 2011/0169946 | A1* | 7/2011 | Rudin | G06T 17/05 |
| | | | | 348/135 |
| 2014/0104169 | A1* | 4/2014 | Masselli | G01B 11/03 |
| | | | | 345/157 |
| 2015/0248584 | A1* | 9/2015 | Greveson | G06T 7/73 |
| | | | | 382/113 |
| 2017/0168160 | A1* | 6/2017 | Metzler | G01S 17/86 |
| 2018/0045516 | A1* | 2/2018 | Sumizawa | G01C 21/005 |
| 2018/0114339 | A1* | 4/2018 | Ikeda | H04N 23/80 |
| 2018/0120107 | A1* | 5/2018 | Maehara | G01B 11/002 |
| 2018/0224270 | A1* | 8/2018 | Wolke | G01S 7/4865 |
| 2019/0114911 | A1* | 4/2019 | Rezaei | G01S 5/16 |
| 2019/0122437 | A1* | 4/2019 | Pinti | G06V 10/225 |
| 2019/0147609 | A1* | 5/2019 | Lohry | G06V 20/64 |
| | | | | 382/154 |
| 2020/0098135 | A1* | 3/2020 | Ganjineh | G06F 16/587 |
| 2020/0301445 | A1* | 9/2020 | Jourdan | B64U 30/20 |
| 2022/0138969 | A1* | 5/2022 | Forsgren | G06V 20/52 |
| | | | | 382/103 |

OTHER PUBLICATIONS

International Search Report for counterpart PCT Application PCT/GB2019/053199, dated Jul. 6, 2020.

* cited by examiner

LOCATING SYSTEM

This invention relates to a locating system in particular, but without limitation, to a locating system that can pinpoint the location of an object in 3D space from a remote position.

Object locating is used in many industries, such as surveying, to determine the precise location of objects in 3D space. There are various known surveying techniques that can do this, which essentially make use of trigonometry to triangulate the position of the object using angles and distances from fixed and/or known reference points.

For example, if an observer is located at a known position, they can measure a bearing and distance to an object using a known "range finder" type device. It is then just a matter of transposing the bearing and distance onto a map to place the object on the map.

Range finders can have certain inherent inaccuracies and there are human errors to take into account as well. For example: the precise location of the observer is not always known (to sufficient degree of accuracy); the measured bearing to the object can contain systematic errors such as deviation and variation; and the distance to the target may also be inaccurate. These errors can give rise to errors in the placement of the object on the map and to overcome this, it is known to observe the same object from several different observation points. This yields a "cocked-hat" triangulation, which usually improves the accuracy and/or reliability of the placement of the object in 3D space, i.e. on the map.

However, if the reference points' locations are unknown, then this can be problematic.

In many cases, accurate mapping and/or or satellite imagery data is available, and this can be used to supplement the aforesaid methods. In particular, an observer can take a bearing and distance measurement to the object; as well as taking bearing and distance measurements to several known objects in their field of view. If the known objects are also shown on a corresponding map or satellite image, it is possible to verify, or obtain (if it is not already known) the location of the observer by triangulating his/her position relative to the known objects on the map/satellite image; and then to obtain the location of the object in question by further triangulation processes. This procedure can also be repeated, from different observation points, thereby further improving the accuracy and/or reliability of the result.

Many known range finding/surveying devices incorporate GPS receivers to enable the location of the observation point to be determined with a relatively high degree of accuracy. However, even GPS positioning has inherent errors, and the absolute accuracy of GPS positioning is typically only to within a 10-metre radius. GPS inaccuracies can be corrected using software and/or proprietary databases to bring the positioning accuracy down to the metre-level, or centimetre-level, but this usually requires expensive subscription services, and a data connection, which is not always available.

It will be appreciated from the foregoing that known object location systems suffer from a number of drawbacks, to which this invention aims to provide a solution.

Aspects of the invention are set forth in the appended independent claims. Preferred and/or optional features of the invention are set forth in the appended dependent claims.

The invention differs from known locating systems insofar as it does not rely on any external references, such as map or satellite imagery data, but rather uses its own internal reference system, namely the datums. Because the relative positions of the datums are known, and this can be to a high degree (i.e. sub 1-cm) of accuracy, the system is able to firstly determine the attitude (i.e. the pan, tile, and roll angle) of the camera, and its position in 3D space relative to the datums. Then, it is able to triangulate the position of an object in question using a bearing and range measurement to place the object in 3D space.

If necessary or desired, the location of the object in 3D space can be transposed onto map or satellite imagery data. This can be easily accomplished if there is a known relationship between the position data of at least one of the datums and the real world. In one embodiment, at least one of the datums can be calibrated relative to actual coordinates in real-space. Additionally or alternatively, the system can be configured to determine the position of several objects, whose positions are known from satellite imagery or mapping data, such that the internal coordinate reference system of the locating system can be transposed or snapped onto objects with known positions in real space.

There are at least three datums, whose relative positions are known. This enables the pan, tilt and roll angle of the camera, as well as its position relative to the datums to be determined. In certain embodiments, three or more datums are visible in an image captured by the camera. In certain embodiments, the camera is fixed relative to one datum, and two or more datums are visible in the image captured by the camera. In either case, there will be at least three datums, whose relative positions are known, and this ensures that the pan, tilt and roll angle of the camera, as well as its X, Y, Z offset or position relative to the datums, can always be determined.

In certain embodiments, the positioning systems comprise GPS receivers. Because they are calibrated relative to one another, there may not be any need to take into account absolute inaccuracies in their position data. For example, it is well-known that GPS data contains inaccuracies, which are either systematic, or are deliberate. Deliberate GPS inaccuracies are introduced to ensure that only users of the satellite navigation system that have access to up-to-date calibration/offset data (usually on a military-only, or on a subscription basis) can obtain the highest levels of positioning accuracy. However, the present invention does not need access to up-to-date absolute correction data because it works on a relative internal reference system, which can, at the user's option, be "snapped" onto real-world reference points, such as identifiable objects (such as buildings, structures or land features) in mapping or satellite imagery data.

In certain embodiments of the invention, the datums are portable and/or mobile. In one embodiment, the datums can be body-worn devices, for example, by being affixed to headgear or clothing of a person, who is visible in the image captured by the camera. In another embodiment, the datums can be vehicle-mounted devices, for example, by being affixed to the roof of a vehicle, which is visible in the image captured by the camera. In other embodiments, the datums can be drone-mounted devices, for example, by being affixed to a drone or other ROV, which is visible in the image captured by the camera.

The observation device may be tripod-mounted, or a hand-held device. Additionally or alternatively, the observation device may be drone-mounted, or affixed to an ROV.

In a preferred embodiment of the invention, the observation device is, or is part of, the payload of a first drone or ROV, and the datums are, or are part of, the payloads of other drones or ROVs. The drones or ROVs can be operated to move in a "formation" such that at least three of the other drones or ROVs are in the field of view of the camera mounted on the first drone or ROV.

In a most preferred embodiment of the invention, the observation device and at least one of the datums are, or are part of, the payload of a first drone or ROV; and the datums are, or are part of, the payloads of other drones or ROVs. The drones or ROVs can be operated to move in a "formation" such that at least two of the other drones or ROVs are in the field of view of the camera mounted on the first drone or ROV.

The system suitably comprises a triggering system, which can be a signal sent by the transceiver of the computing device to the transceivers of the other elements of the system. Upon receipt of the trigger signal, each of the other elements can be configured to capture and record position, image and/or distance data. By using a triggering system, it can be ensured that the data from each element is temporally coordinated.

Suitably, each element of the system comprises a data log, which captures and records position, image and/or distance data continuously or at intervals, along with a corresponding time stamp. By logging data thus, it is possible to retrospectively determine the position of the object: using time-coordinated and logged data. This may be particularly beneficial where radio telecommunications are poor and/or where processing/calculation is near-time, or cannot be carried out in real-time.

Embodiments of the invention shall now be described, by way of example only, with reference to the accompanying drawings in which.

Figure 1:
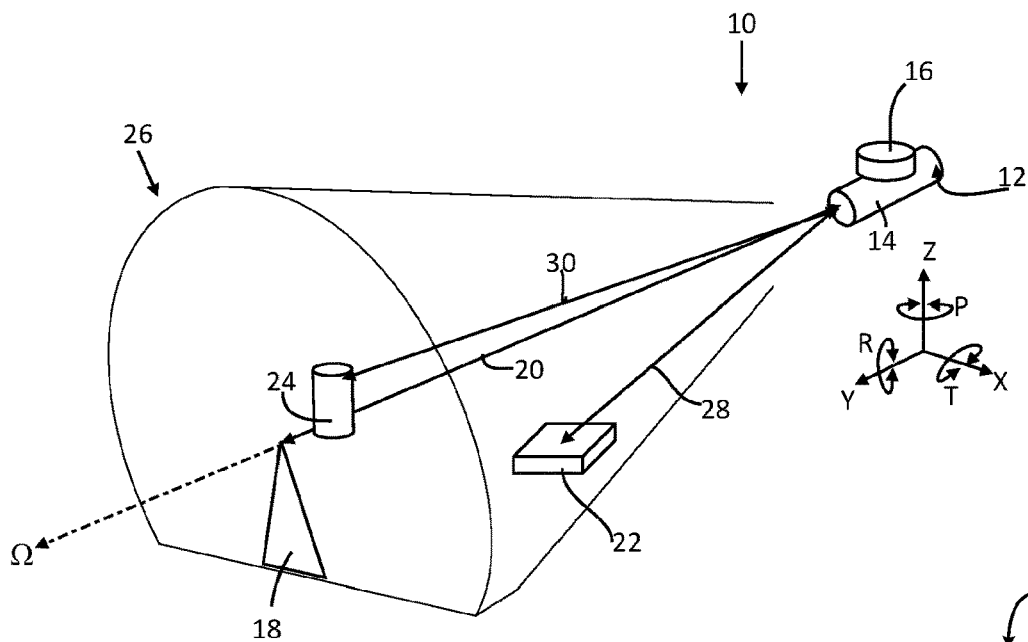
FIG. 1 is a schematic perspective view of a known targeting system.

Referring to FIG. 1 of the drawings, a known targeting system 10 comprises a range finder device 12, which comprises a forward-facing camera 14 and an on-board compass 16. The range finder device 12 is located at an unknown position in space and the user (not shown) sights an object 18 through the viewfinder and uses an on-board laser range finder to obtain the line-of-sight distance 20 to the object 18.

At the time the distance measurement 20 is taken, the compass 16 also records the bearing to the object 18, and this results in a distance and bearing from the observer to the object 18.

The user (not shown) can then repeat the procedure for other known objects 22, 24 in the field of view 26 of the range finder 12; and obtains corresponding distance measurements 28, 30 and bearings to those other objects 22, 24.

Figure 2:
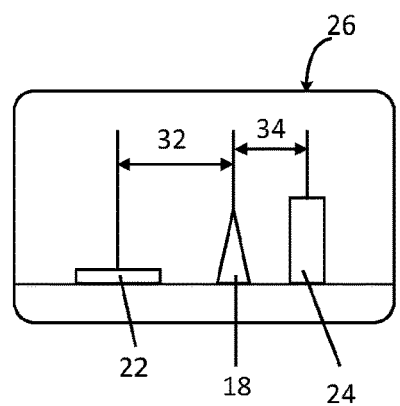
FIG. 2 is a schematic representation of the view through a viewfinder of the targeting system of FIG. 1.

The view through the viewfinder of the targeting system 12 is shown schematically in FIG. 2 of the drawings, in which the principal object 18 (whose position is, as yet, unknown) is in the centre of the field of view 26, the first known object 22 is to the left of the principal object 18, and the second known object 24 is to the right of the principal object 18.

It will be appreciated that it is possible to obtain a subtended angle between the principle object 18 and the first object 22; and the principle object 18 and the second object 24—by considering the position of those objects relative to one another in the field of view 26. Specifically, the pixel positions within the field of view 26 correspond to angles from the optical axis Ω of the targeting range finder 12. Therefore, using the viewfinder, it is possible to calculate an angle 32 between the principle object 18 and the first known object 22; and a second angle 34 between the principle object 18 and the second known object 24.

Figure 3:
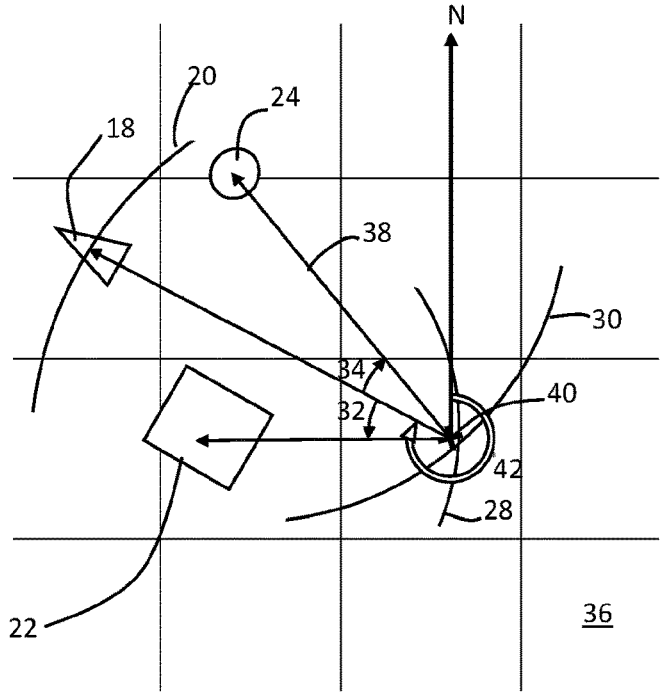
FIG. 3 is a schematic construct of the data obtained by the targeting system of FIG. 1.

Referring now to FIG. 3 of the drawings, trigonometric construct is shown. On a map 36, the first 22 and second 24 known objects are identified and the total angle between them, that is to say angle 32 plus angle 34 can be plotted as pointing vectors 38 on the map 36. Given that the distance to the first and second known objects 28, 30 is known, it is possible, using this information, to triangulate the position 40 of the observer on the map 36. Now, because the bearing 42 and distance 20 to the principle object 18 are both known from the aforesaid measurement, it is possible to place the principle object 18 on the map 36 and thereby identify its position in 3D space.

In the aforedescribed illustration, map 36 data was used, but it is also common nowadays to use satellite imagery for the same purpose. There are, nevertheless, some inaccuracies, namely in the distance and bearing measurements, which can result in inaccuracies in the positioning of the principle object 18 on the map 36 or satellite imagery (not shown). In addition, especially where satellite imagery is used as the reference 36, where the satellite image is not taken from directly overhead, various slanting and/or parallax errors can be introduced.

Figure 4:
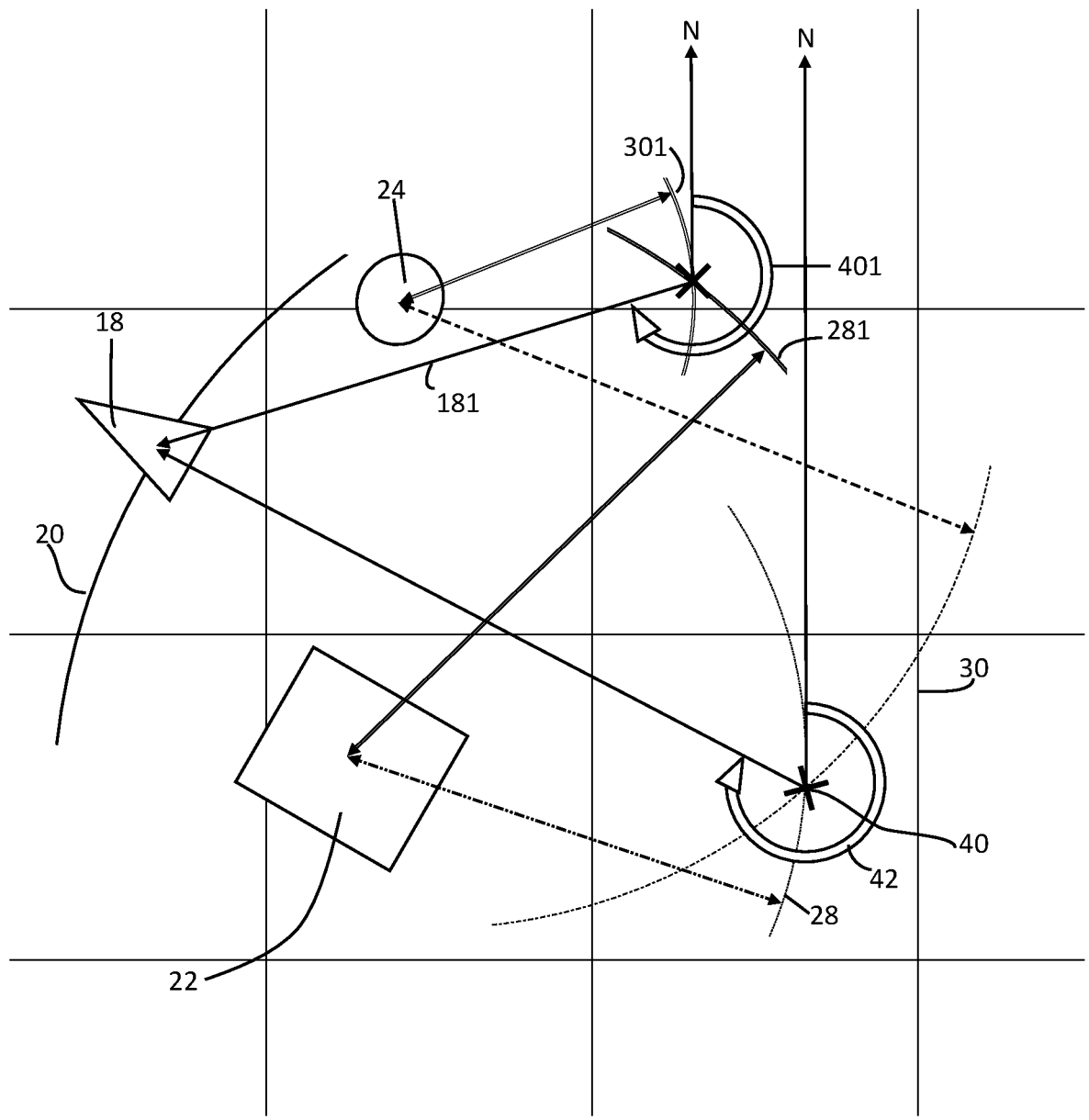
FIG. 4 shows an alternate schematic of a triangulation system for a known targeting system.

To reduce the errors, the same principle object 18 can be observed from different viewpoints as shown in FIG. 4, in which identical reference signs have been used to identify identical features from FIG. 3 (to avoid unnecessary repetition).

In the example of FIG. 4, a second observer is positioned slightly north-west of the first observer's position 40. This observer can carry out the same procedure as outlined above, which yields separate measurements of the distance 181 and bearing 401 to the principle object 18; as well as independent measurements of the distance 181, 301 and bearings to the known first and second objects 22, 24.

If the measurements taken by both observers are accurate, then the principle object 18 will be located at the same position using both constructs, but not otherwise. Errors in the measurement can therefore be easily identified and rectified by taking further measurements and/or by repeating measurements.

The problem with the known system described above is that it relies upon the field of view 26 of the range finder 12, as well as "plan view" data, for example from mapping and satellite imagery. If the range finder 12 is horizontal, and the satellite imagery is taken from vertically above the area, then errors in this trigonometric analysis can be minimised. However, that "ideal" situation is rarely achieved because satellite imagery is often taken at an angle to the ground surface, and unless the range finder 12 is at the same height as the principle object 18, then there will be a pan/tilt/roll angle to take into account as well, which has not been factored for.

Whilst it may be possible to add attitude sensors to the range finder 12 to determine its pan, tilt and roll angles, attitude sensors tend to be bulky and heavy items (as in the case of gyroscopes) or be inaccurate and subject to "drift" where they are solid-state devices. As such, accurate measurement of the pan, tilt and roll of the device (as indicated by the co-ordinate system P,T,R in FIG. 1) is inherently difficult.

It may also be possible to fit a GPS unit to the range finder 12, which could also yield the X, Y and Z coordinates of the tracking device at the time the image was captured through the viewfinder. However, as the X, Y and Z coordinates of the principle object 18 are unknown, there is no way to use this to calculate the pan, tilt and roll of the range finder 12.

Figure 5:
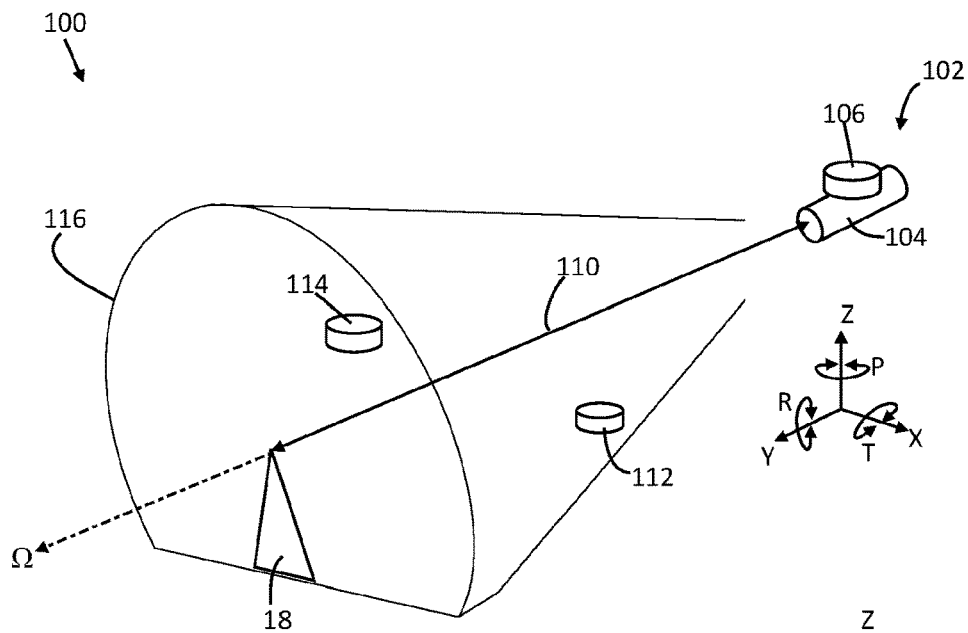
FIG. 5 is a schematic representation of a first embodiment of a targeting system in accordance with the invention.

Referring now to FIG. 5 of the drawings, a locating system 100 in accordance with the invention is shown. The locating system 100 comprises an observation device 102, which has a camera 104, a rangefinder (not visible) and a positioning device 106 fitted to it. The observation device 102 is pointed towards a principal object 18 and its optical access Ω is conveniently centred on the principle object 18. When triggered, the rangefinder of the observation device 102 is able to determine a distance 110 between the principle object 18 and the observation device 102. When triggered, the camera 104 captures an image of a scene containing the principal object 18, as well as 2 datums 112, 114. The two datums 112, 114 each comprise a positioning system, and the positioning systems 112, 114, 106 are accurately calibrated relative to one another. A camera 104 has a field of view 116, which captures, simultaneously, the principal object 18 as well as the two datums 112, 114.

Figure 6:
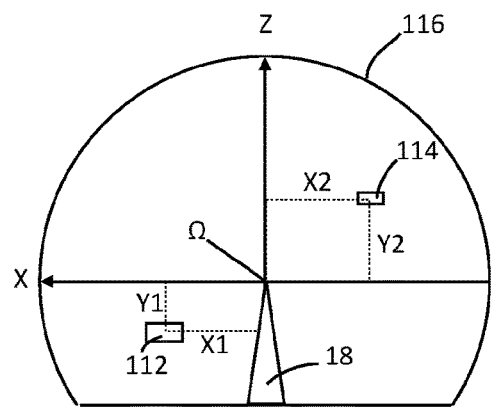
FIG. 6 is a schematic representation of a view through the viewfinder of the targeting system of FIG. 5.

The image captured by the camera 104 is shown, schematically, in FIG. 6 of the drawings in which principal object 18 is on the optical access Ω and in which a first datum 112 below and left of the optical access Ω, whereas the other datum 114 is above and to the right of the optical access Ω. The captured image is a digital image and it is possible to calculate the angle between the optical access Ω and each of the datums 112, 114 by measuring the vertical and horizontal offsets Y1, Y2, X1, X2 of each datum from the optical access Ω. The subtended angle will, of course, depend on the settings of the camera such as its focus and zoom setting, but this can be easily calculated.

Figure 7:
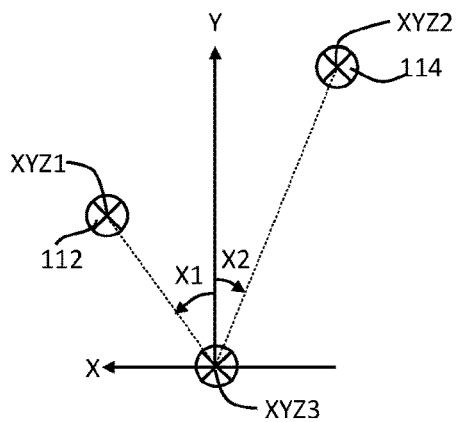
FIGS. 7 and 8 are, respectively, plan and side constructs of the information captured by the targeting system of FIG. 5.
Figure 8:
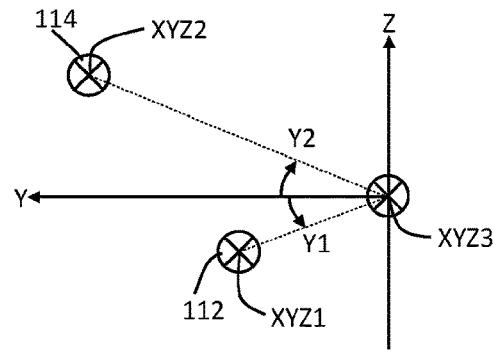
Figure 9:
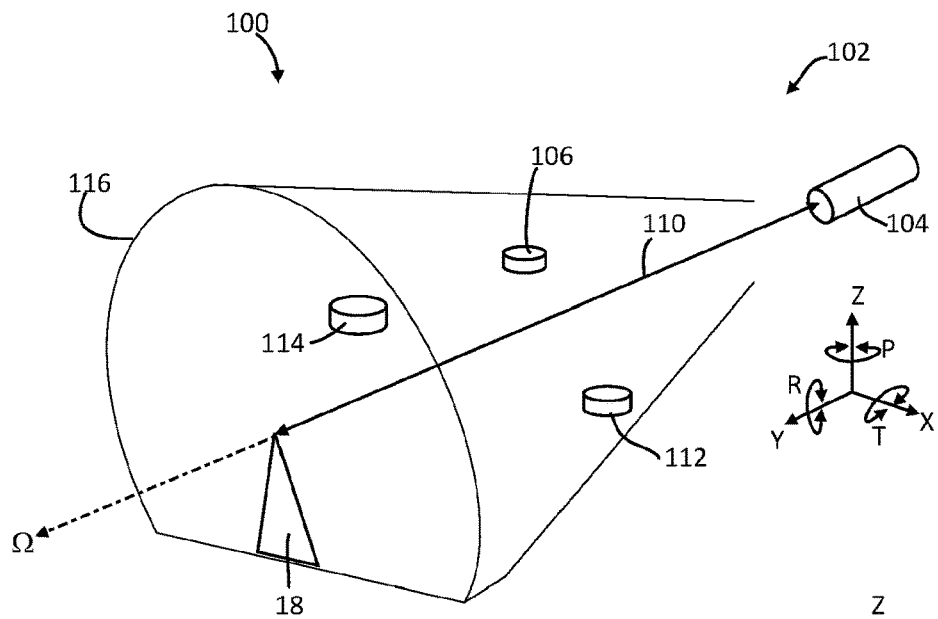
FIG. 9 is a schematic perspective view of a second embodiment of the targeting system in accordance with the invention.
Figure 10:
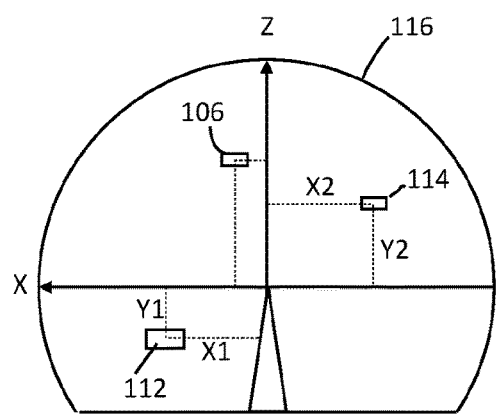
FIG. 10 is a schematic representation of a view through the viewfinder of the targeting system of FIG. 9.
Figure 11:
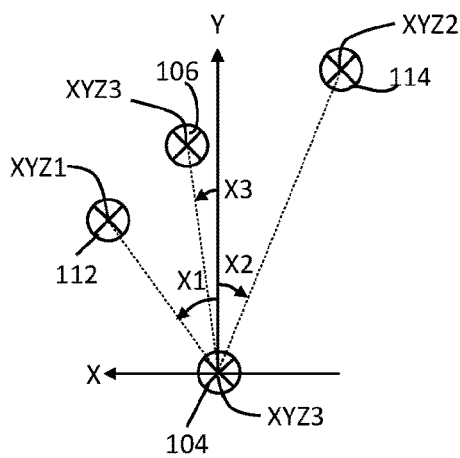
FIGS. 11 and 12 are, respectively, plan and side views of a construct using the information gathered by the targeting system of FIG. 9.
Figure 12:
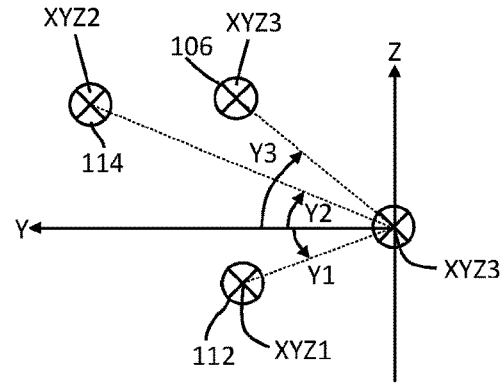

Referring now to FIGS. 7 and 8 of the drawings, the positions of the two datums, 112, 114 can be plotted in horizontal plane, as shown in FIG. 7, as well as in a vertical plane, as shown in FIG. 8. The horizontal angle X1 between the optical access Ω and the first datum 112 is shown, as well as the horizontal angle X2 between the optical access Ω and the second data 114 in FIG. 7. Likewise, the vertical angles Y1, Y2 are shown in FIG. 8.

The X, Y and Z coordinates of the positioning devices 106, 112, 114 are known and, because they are calibrated relative to one another, it is possible to calculate the relative position of the three positioning systems 106, 112, 114. Using this information, as well as the measured angles between them, it is possible to calculate the position of the observation device 102 relative to the two datums 112, 114, as well as its pan, tilt and roll angle. Now that the position and attitude of the observation device 102 has been determined, by reference only to the datums, the position of the principal object 18, relative to the observation device 102 can now be calculated using the distance measurement 110 and the relative position of the principal object 18 in the camera's 104 field of view 116.

If the principal object 18 is an object whose position is known on a map or satellite imagery, then it is possible to "snap" the internal reference system of the object locating system 100 onto real-world mapping or satellite imagery data. The process can then be repeated for other principal objects within the field of view 116 to enable the positions of those objects to the principal object 18 and/or the observation device 102, to be accurately determined.

Referring now to FIGS. 9, 10, 11 and 12 of the drawings, which largely mirror FIGS. 5, 6, 7 and 8, a variation of the object locating system 100 is shown. In this example, the observation device 102 comprises a camera 104 as previously described, as well as a range-finding device, which can determine the line-of-sight-distance 110 from the camera 104 to a principal object 18. In this case, however, the observation device 102 does not have a built-in positioning system, but rather, three datums 106, 112, 114 are captured within the field of view 116 of the camera 104.

The same process can be repeated to determine the position of the camera relative to the three datums 106, 112, 114, as previously described. Although the calculation is somewhat less direct, it is, nevertheless, possible to calculate the position of the camera 104 relative to the three datums 106, 112, 114 via trigonometry and then, to calculate the position of the principal object 18 relative to the camera 104, using its relative position within the field of view 116 and the distance measurement 110. Again, the internal reference system of the locating system 100 can be "snapped" onto mapping or satellite imagery data so that the absolute position of the principal object 18 can be determined.

Once an image of a scene has been captured, with known reference points identified within it, it is possible to use a rangefinder, located at the observation point, to "pick off" other objects within the field of view. By this method, an observer can use the datums and methods previously described to determine the orientation and position of the observation camera in real space, and keeping the observation camera centred on that known point, use it to range-find other objects within the field of view. By this method, the positions of those other (range-found) objects can be accurately determined, relative to the reference system created previously. The range-finder provides a distance to a target/object, as well as an azimuth and elevation angle, which can be inputted into the reference system to triangulate/calculate/determine the positions of those other objects.

Figure 13:
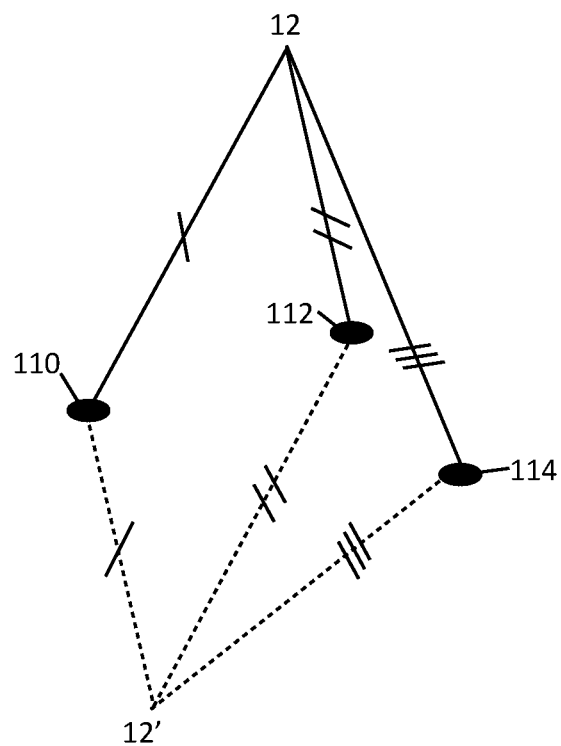
FIGS. 13 and 14 are three- and four-datum constructions in accordance with the invention.

It will be appreciated that where only three datums are used, there may be situations where there are two possible "mirrored" solutions (indicated by dashed and solid construction lines) to the triangulation problem. Referring to FIG. 13 of the drawings, such as situation is shown, whereby, mathematically, the observation camera 12 could be at position 12 or 12', for a given set of distances (/, //, ///) measured from the camera 12 to the datums 110, 112, 114. The computing device suitably comprises a logic system that disregards absurd or unlikely solutions (12' in this case), such as where the camera 12' would be located below ground level.

Figure 14:
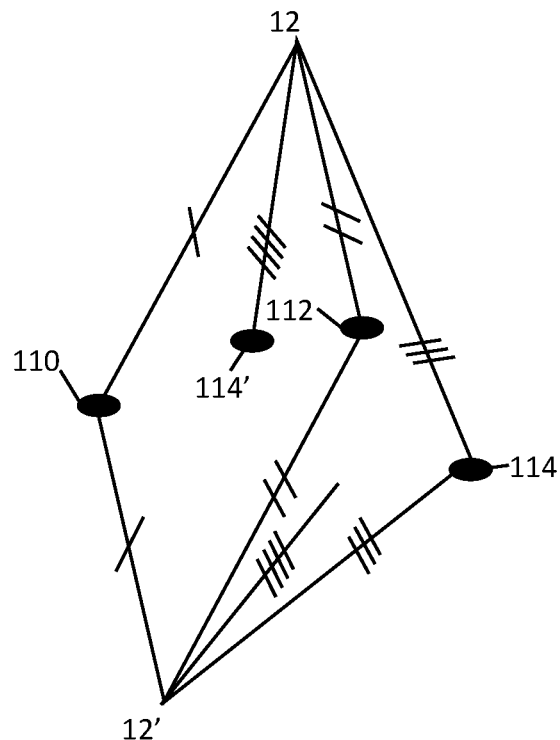

To reduce the possibility of having multiple solutions to the triangulation problem, by providing four or more datums 110, 112, 114, 114', as shown in FIG. 14, an additional construction line (////) is used. Where four or more datums are used, the probability of finding multiple valid solutions to the triangulation problem is greatly reduced. Accordingly, the minimum number of datums is three, the preferred number of datums is four, and the most preferred number of datums is more than four.

The invention is not restricted to the details of the foregoing embodiments, which are merely exemplary of the invention.

What is claimed is:

1. An object locating system comprising:
   a. a computing device comprising a transceiver;
   b. at least three datums, each datum comprising:
      i. a positioning device calibrated relative to the positioning devices of the other datums; and
      ii. a transceiver adapted to broadcast—to the transceiver of the computing device—a position of the datum;
   c. an observation device comprising:
      i. a camera adapted, in use, to capture an image of a scene containing an object whose position is to be determined and at least two of the datums; and
      ii. a range finder adapted, in use, to measure the distance or distances between the observation device and at least one object within the field of view of the camera; and
      iii. a transceiver adapted to broadcast—to the transceiver of the computing device—the captured image and the or each measured distance or distances; wherein
   the computing device being is adapted:
   d. to calculate an azimuth and elevation angle between two datums, or between the optical axis of the camera and each datum, in the image;
   e. to triangulate the position and attitude of the camera at the time the image was captured using received position data for each datum at the time the image was captured; and
   f. to calculate an azimuth and elevation angle between an optical axis of the camera and the object in the image; and knowing the position and attitude of the camera and a distance to the object at the time the image was captured, to triangulate a position of the object at the time the image was captured.

2. The object locating system of claim 1, wherein the computing device is adapted to triangulate all possible positions and attitudes of the camera at the time the image was captured based on solutions to the received position data for each datum at the time the image was captured, and to disregard possible solutions that are improbable mirror images of other solutions.

3. The object locating system of claim 1, comprising four or more datums.

4. The object locating system of claim 1, wherein any one or more of:
   a. the azimuth and elevation angle between the two datums, or between the optical axis of the camera and each datum;
   b. the azimuth and elevation angle between the optical axis of the camera and the object in the image
is calculated based on the pixel positions of each datum in the captured image.

5. The object locating system of claim 1, wherein the computing device is adapted to transpose the location of the object in 3D space onto map or satellite imagery data and to:
   a. determine the position of several objects, whose positions are known from satellite imagery or mapping data; and
   b. transpose the internal coordinate reference system of the locating system onto those objects with known positions in real space.

6. The object locating system of claim 1, wherein the pan, tilt and roll angle of the camera, as well as its position relative to the datums is determined.

7. The object locating system of claim 1, wherein three or more datums are visible in the image captured by the camera and wherein the camera is fixed relative to one datum, and two or more datums are visible in the image captured by the camera.

8. The object locating system of claim 1, wherein the positioning systems comprise a GNSS or GPS receiver.

9. The object locating system of claim 1, wherein the datum comprises any one or more of:
   a body-worn device,
   a vehicle-mounted device, and
   a drone-mounted device;
and wherein the observation device is any one or more of:
   tripod-mounted,
   hand-held,
   drone-mounted, and
   affixed to a remotely operated vehicle.

10. The object locating system of claim 1, wherein the observation device is, or is part of, the payload of a first drone or ROV, and the datums are, or are part of, the payloads of other drones or ROVs, the drones or ROVs being operated to move in formation such that at least three of the other drones or ROVs are in the field of view of the camera mounted on the first drone or ROV.

11. The object locating system of claim 1, further comprising any one or more of:
   a triggering system, which sends a signal from the transceiver of the computing device to the transceivers of the other elements of the system, whereby upon receipt of the trigger signal, each of the other elements are configured to capture and record position, image and/or distance data; and
   a data log, which captures and records position, image and/or distance data continuously or at intervals, along with a corresponding time stamp.

12. An object locating method comprising the steps of:
   a. providing an observation device with a camera;
   b. receiving the relative positions of at least three datums;
   c. using the observation device, capturing an image of a scene containing the object whose position is to be determined and at least two of the datums;
   d. measuring the distance or distances between the observation device and the object or objects within the field of view of the camera; and
   e. calculating an azimuth and elevation angle between two datums, or between the optical axis of the camera and each datum, in the image;
   f. triangulating the position and attitude of the camera at the time the image was captured using received position data for each datum at the time the image was captured;
   g. calculating an azimuth and elevation angle between an optical axis of the camera and the object in the image; and
   h. using the calculated position and attitude of the camera and a distance to the object at the time the image was captured, triangulating a position of the object at the time the image was captured.

13. The method of claim 12 comprising triangulating all possible positions and attitudes of the camera at the time the image was captured based on solutions to the position data for each datum at the time the image was captured, and disregarding possible solutions that are improbable mirror images of other solutions, the angles being calculated based on the pixel positions of each datum in the captured image, and further comprising the step of transposing the location of the object in 3D space onto map or satellite imagery data.

14. The method of claim 13, comprising:
   a. determining the position of several objects, whose positions are known from satellite imagery or mapping data; and
   b. transposing the internal coordinate reference system of the locating system onto those objects with known positions in real space.

15. The method of claim 12, comprising triggering the data capture using a triggering system, which sends a signal from the transceiver of the computing device to the transceivers of the other elements of the system, whereby upon receipt of the trigger signal, each of the other elements are configured to capture and record position, image and/or distance data and capturing and recording position, image and/or distance data continuously or at intervals, along with a corresponding time stamp.

\* \* \* \* \*